United States Patent
Kinebuchi

(10) Patent No.: US 10,771,750 B2
(45) Date of Patent: Sep. 8, 2020

(54) PROJECTOR

(71) Applicant: SEIKO EPSON CORPORATION, Tokyo (JP)

(72) Inventor: Tadashi Kinebuchi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/451,710

(22) Filed: Mar. 7, 2017

(65) Prior Publication Data

US 2017/0280116 A1  Sep. 28, 2017

(30) Foreign Application Priority Data

Mar. 28, 2016 (JP) .................. 2016-064222

(51) Int. Cl.
*H04N 9/31* (2006.01)
*G03B 21/14* (2006.01)

(52) U.S. Cl.
CPC ......... *H04N 9/3141* (2013.01); *G03B 21/145* (2013.01)

(58) Field of Classification Search
CPC .................................................. H04N 9/3141
USPC ........................................................ 348/789
See application file for complete search history.

(56) References Cited

U.S. PATENT DOCUMENTS

| | | | | |
|---|---|---|---|---|
| 2008/0192226 A1* | 8/2008 | Shibazaki | ........... | G03F 7/70716 355/72 |
| 2011/0266392 A1* | 11/2011 | Goehlich | ........... | B64D 11/0015 244/118.6 |
| 2013/0285519 A1* | 10/2013 | Tranter | ................... | A47B 17/04 312/204 |
| 2014/0077052 A1* | 3/2014 | Enochs | .................. | G03B 21/54 248/324 |
| 2015/0022785 A1 | 1/2015 | Kinebuchi et al. | | |
| 2015/0092165 A1* | 4/2015 | Mikawa | ................. | G03B 21/16 353/61 |
| 2015/0244996 A1* | 8/2015 | Yoshida | .............. | H04N 9/3155 353/85 |
| 2016/0011495 A1* | 1/2016 | Takagi | ................. | G03B 21/145 353/119 |
| 2016/0291448 A1 | 10/2016 | Kinebuchi et al. | | |
| 2018/0350363 A1* | 12/2018 | Cook | .................. | F21V 33/0056 |

FOREIGN PATENT DOCUMENTS

| | | | | |
|---|---|---|---|---|
| JP | 2004233692 A | * | 8/2004 | ............. G03B 21/00 |
| JP | 2006-349790 A | | 12/2006 | |
| JP | 2009-048155 A | | 3/2009 | |
| JP | 2010-164685 A | | 7/2010 | |
| JP | 2013-142845 A | | 7/2013 | |
| JP | 2015-022147 A | | 2/2015 | |

* cited by examiner

*Primary Examiner* — Jefferey F Harold
*Assistant Examiner* — Justin B Sanders
(74) *Attorney, Agent, or Firm* — Oliff PLC

(57) ABSTRACT

A projector including a projection section that projects image light, a power supply section that supplies the projection section with electric power, a first enclosure that accommodates the projection section, and a second enclosure that accommodates the power supply section, wherein the second enclosure is fixed to a ceiling joist receiver that serves as a support member that supports a ceiling plate that partitions a space into a living room space and a space behind a ceiling, and the first enclosure and the second enclosure are configured to be separate from each other.

5 Claims, 6 Drawing Sheets

PROJECTOR

The entire disclosure of Japanese Patent Application No. 2016-064222, filed Mar. 28, 2016 is expressly incorporated by reference herein.

BACKGROUND

1. Technical Field

The present invention relates to a projector.

2. Related Art

There is a known projector of related art installed on a ceiling or under a floor (see JP-A-2009-48155, for example). JP-A-2009-48155 discloses a projection-type video display apparatus so configured that an enclosure that accommodates a main body of a projector is hung from a main ceiling (building frame) by using turnbuckles as ceiling hangers and a flange of the enclosure is fixed to the periphery of an opening of a ceiling plate, for example, with screws.

To install a projector behind a ceiling, it is conceivable to employ a method for hanging the projector from a building structure by using a ceiling hanger in consideration of the weight of the projector, as disclosed in JP-A-2009-48155. In the method, however, attaching the projector is cumbersome, and other installation methods have been studied.

SUMMARY

An advantage of some aspects of the invention is to provide a projector that is readily installed behind a ceiling and in other places.

A projector according to an aspect of the invention includes a projection section that projects image light, a power supply section that supplies the projection section with electric power, a first enclosure that accommodates the projection section, and a second enclosure that accommodates the power supply section. The second enclosure is fixed to a support member that supports a partitioning surface that partitions a space into a first space and a second space, and the first enclosure and the second enclosure are configured to be separate from each other.

According to the aspect of the invention, the first enclosure, which accommodates the projection section, and the second enclosure, which accommodates the power supply section, are configured to be separate from each other, and the second enclosure is fixed to the support member. The weight of the first enclosure, which accommodates the projection section, can therefore be reduced, whereby the first enclosure can be readily installed on the partitioning surface, which is, for example, a ceiling that partitions a space.

In the projector described above, at least part of the first enclosure and the second enclosure may be disposed in the second space, a projection port formed in the first enclosure may be exposed through an opening provided in the partitioning surface, and the projection section may project the image light through the projection port into the first space.

According to the aspect of the invention with this configuration, at least part of the first enclosure and the second enclosure are disposed in the second space and are therefore be invisible from the first space, into which the image light is projected, whereby the exterior appearance of the partitioning surface can be improved.

In the projector described above, the first enclosure may include a fixing section that fixes the first enclosure to the partitioning surface with the projection port exposed through the opening.

According to the aspect of the invention with this configuration, the first enclosure can be fixed to the partitioning surface via the fixing section. The lightweight first enclosure can therefore be reliably held by the partitioning surface.

In the projector described above, the second enclosure may be fixed to the support member via a pair of sandwiching members that sandwich the support member on opposite sides.

According to the aspect of the invention with this configuration, the second enclosure can be fixed to the support member in a simple configuration.

In the projector described above, the first enclosure may be fixed to the second enclosure.

According to the aspect of the invention with this configuration, since the first enclosure is fixed to the second enclosure, the amount of load acting on the partitioning surface, which is, for example, a ceiling that partitions a space, can be reduced, and the first enclosure can further be readily provided above the partitioning surface.

In the projector described above, a position on the second enclosure where the first enclosure is fixed thereto may be allowed to be changed in a direction parallel to the partitioning surface.

According to the aspect of the invention with this configuration, the position on the second enclosure where the first enclosure is fixed thereto can be changed in the direction parallel to the partitioning surface. The position where the first enclosure is installed can therefore be changed in accordance with the environment in which the projector is installed.

In the projector described above, a position of the first enclosure fixed to the second enclosure may be allowed to be changed in a direction perpendicular to the partitioning surface.

According to the aspect of the invention with this configuration, the position of the first enclosure fixed to the second enclosure can be changed in the direction perpendicular to the partitioning surface. The position of the first enclosure fixed to the second enclosure can therefore be changed in accordance with the environment in which the projector is installed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
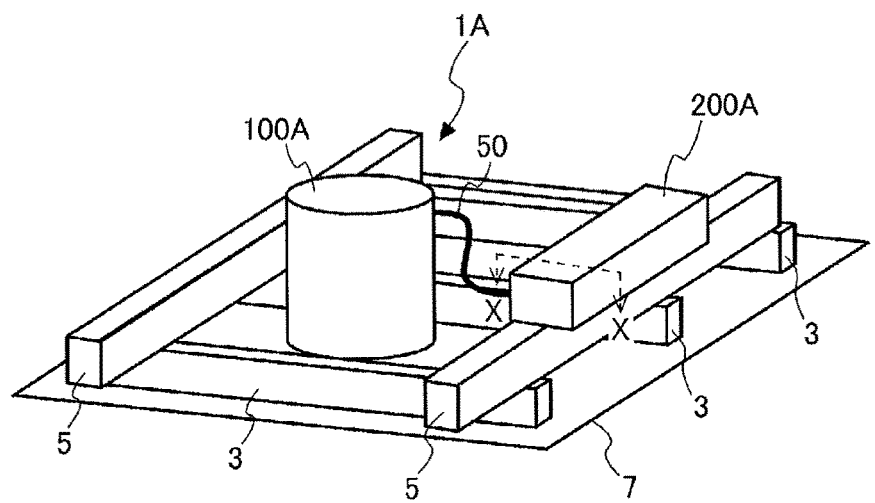
FIG. 1 is a perspective view showing the state in which a projector according to a first embodiment is installed.

FIG. 1 is a perspective view showing the state in which a projector 1A according to a first embodiment is installed.

The projector 1A according to the present embodiment is installed behind a ceiling (second space) having a hanging ceiling structure.

The hanging ceiling structure is a structure in which a plurality of ceiling joists 3 and a plurality of ceiling joist receivers 5 as well as a ceiling plate 7 are hung from and supported by a building frame (not shown) of a building via hanging bolts (not shown). The ceiling plate 7 corresponds to the partitioning surface in an aspect of the invention.

Each of the ceiling joists 3 and the ceiling joist receivers 5 is an elongated, rod-shaped member and corresponds to the support member in an aspect of the invention. The plurality of ceiling joists 3 are arranged in a certain horizontal direction at predetermined intervals and support the ceiling plate 7 on the rear side thereof. The plurality of ceiling joist receivers 5 are arranged in another horizontal direction perpendicular to the ceiling joists 3 at predetermined intervals and support the plurality of ceiling joists 3. The plurality of ceiling joist receivers 5 have lower ends connected to the plurality of ceiling joists 3 and upper ends hung from and supported by the plurality of hanging bolts fixed to a building frame located at a higher level of the building. The ceiling plate 7 is fixed to the lower surfaces of the plurality of ceiling joists 3, for example, with screws. The ceiling joists 3 and the ceiling joist receivers 5 are arranged in a latticed pattern in a plan view, although only part thereof is shown in FIG. 1.

The projector 1A includes a first enclosure 100A and a second enclosure 200A, and the first enclosure 100A and the second enclosure 200A are connected to each other via a power supply cable 50.

The first enclosure 100A has a cylindrical shape and accommodates, for example, a projection section 110 (see FIG. 4), which projects an image on a projection target, such as a screen. The second enclosure 200A has an elongated, box-like shape and accommodates a power supply section 210 (see FIG. 4), which supplies the projection section 110 with electric power. The power supply section 210 supplies the projection section 110 and other components accommodated in the first enclosure 100A with electric power via the power supply cable 50.

In the present embodiment, the first enclosure 100A, which accommodates the projection section 110, and the second enclosure 200A, which accommodates the power supply section 210, are configured to be separate from each other, and the second enclosure 200A is fixed to one of the ceiling joist receivers 5, each of which serves as the support member.

Since the weight of the first enclosure 100A can therefore be reduced, the first enclosure 100A can be installed, for example, on the ceiling plate 7, which accepts a limited weight. The projector 1A can therefore be installed behind the ceiling without employing a method for hanging or otherwise supporting the projector 1A from a building frame by using ceiling hangers, whereby the projector 1A is readily installed behind the ceiling or in any other place.

Figure 2:
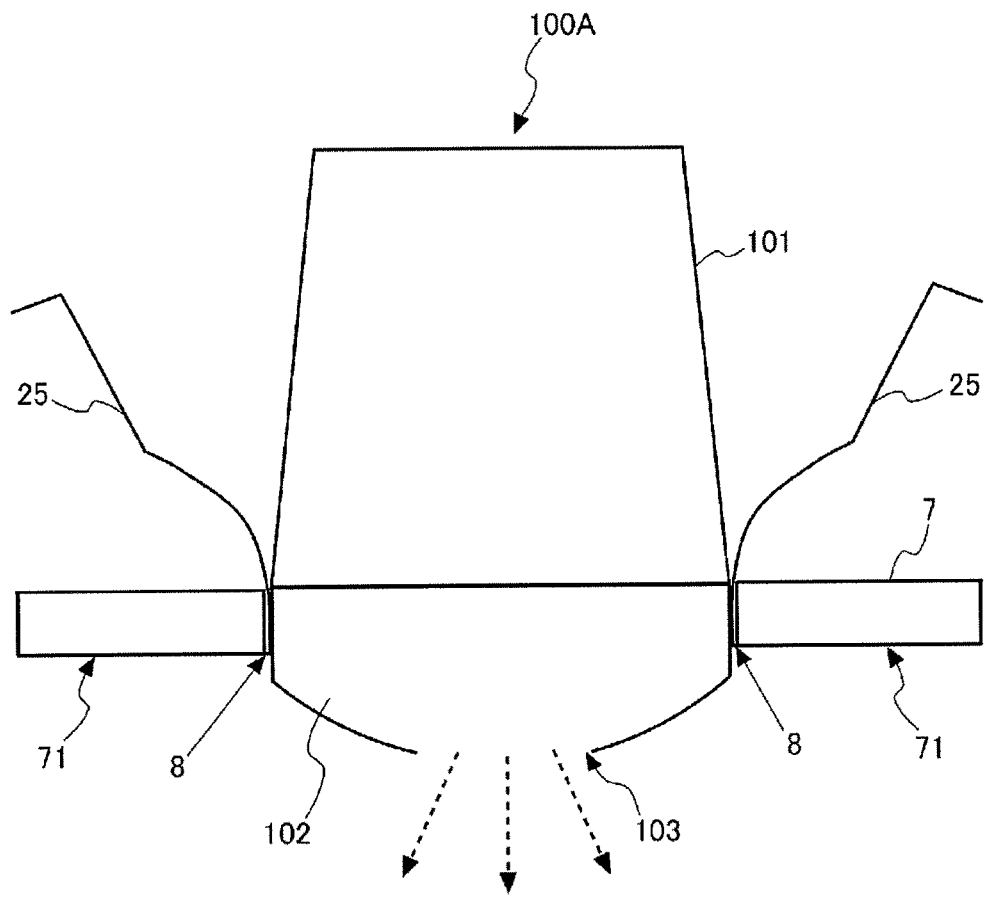
FIG. 2 is a side view showing the state in which a first enclosure is installed.

FIG. 2 is a side view showing the state in which the first enclosure 100A is installed.

The first enclosure 100A is so installed as to be fit into a ceiling opening 8, which is bored through the ceiling plate 7. Part of the first enclosure 100A is disposed behind the ceiling, which is the second space.

The ceiling plate 7 is formed, for example, of a building panel, such as a plate made, for example, of wood, metal, or lightweight concrete, or a plasterboard. The ceiling opening 8, into which part of the first enclosure 100A can be inserted, is formed through the ceiling plate 7.

A pair of attachment springs 25 are provided as part of the exterior of the first enclosure 100A. The pair of attachment springs 25 are, for example, so formed as to face each other with the cylindrical first enclosure 100A sandwiched therebetween. The attachment springs 25 correspond to the fixing section in an aspect of the invention. The fixing section is not limited to the attachment springs 25 and may be any component that fixes the first enclosure 100A to the ceiling plate 7, for example, screws.

The first enclosure 100A is inserted into the ceiling opening 8 from the side facing a ceiling surface 71, which is the side facing an indoor space (first space).

With the first enclosure 100A inserted into the ceiling opening 8, the attachment springs 25 act in such a way that they press the side surface of the ceiling opening 8 outward so that the attachment springs 25 fit with the ceiling plate 7. The elasticity of the attachment springs 25 allows the first enclosure 100A to be so held and fixed that the first enclosure 100A does not fall through the ceiling opening 8.

In the state in which the first enclosure 100A is installed on the ceiling plate 7, a portion of the first enclosure 100A or the portion exposed through the ceiling surface 71 of the ceiling plate 7 is called a protruding section 102, and a portion of the first enclosure 100A or the portion accommodated behind the ceiling, which is the space above the ceiling plate 7, is called a main body section 101.

A projection port 103, through which light outputted from the projection section 110 passes, is formed in the protruding section 102. The projection section 110 projects image light through the projection port 103 toward the indoor space.

Figure 3:
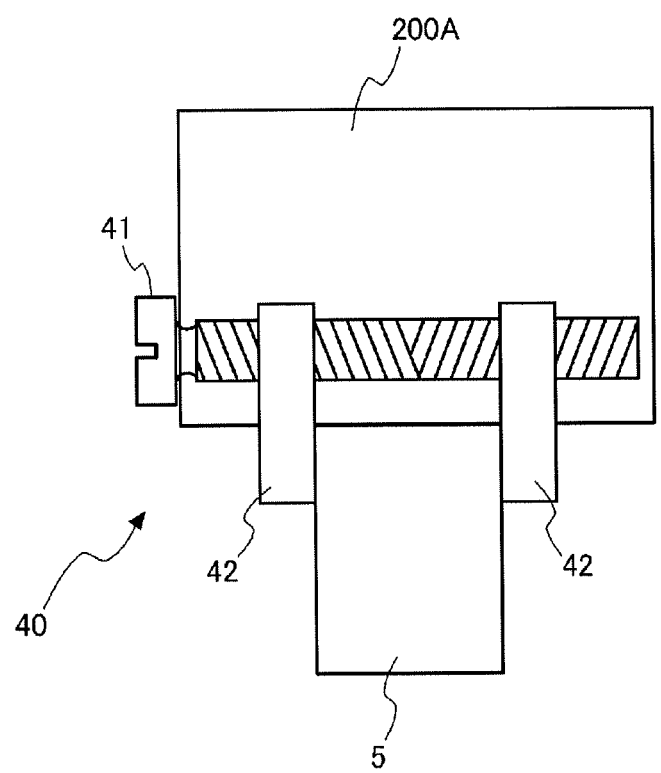
FIG. 3 is a cross-sectional view of a second enclosure taken along the line X-X in FIG. 1.

FIG. 3 is a cross-sectional view of the second enclosure taken along the line X-X in FIG. 1.

The second enclosure 200A is placed on one of the ceiling joist receivers 5 and fixed to the ceiling joist receiver 5 via a fixture 40. The second enclosure 200A is so disposed that the longitudinal direction thereof is parallel not only to the ceiling plate 7 but also to the longitudinal direction of the ceiling joist receiver 5. The fixture 40 includes a right/left screw 41 and a pair of plates 42. The pair of plates 42 correspond to the sandwiching member in an aspect of the invention.

The right/left screw 41 has right and left portions on opposite sides of the center of the right/left screw 41, and the right and left portions are threaded in opposite directions. The pair of plates 42 each have a threaded through hole.

When the right/left screw 41 is inserted through the threaded through holes of the pair of plates 42, and an end portion of the inserted right/left screw 41 is fastened with a nut (not shown), the pair of plates 42 sandwich the corresponding ceiling joist receiver 5, whereby the second enclosure 200A is held by and fixed to the ceiling joist receiver 5 with the second enclosure 200A in intimate contact with the ceiling joist receiver 5.

Figure 4:
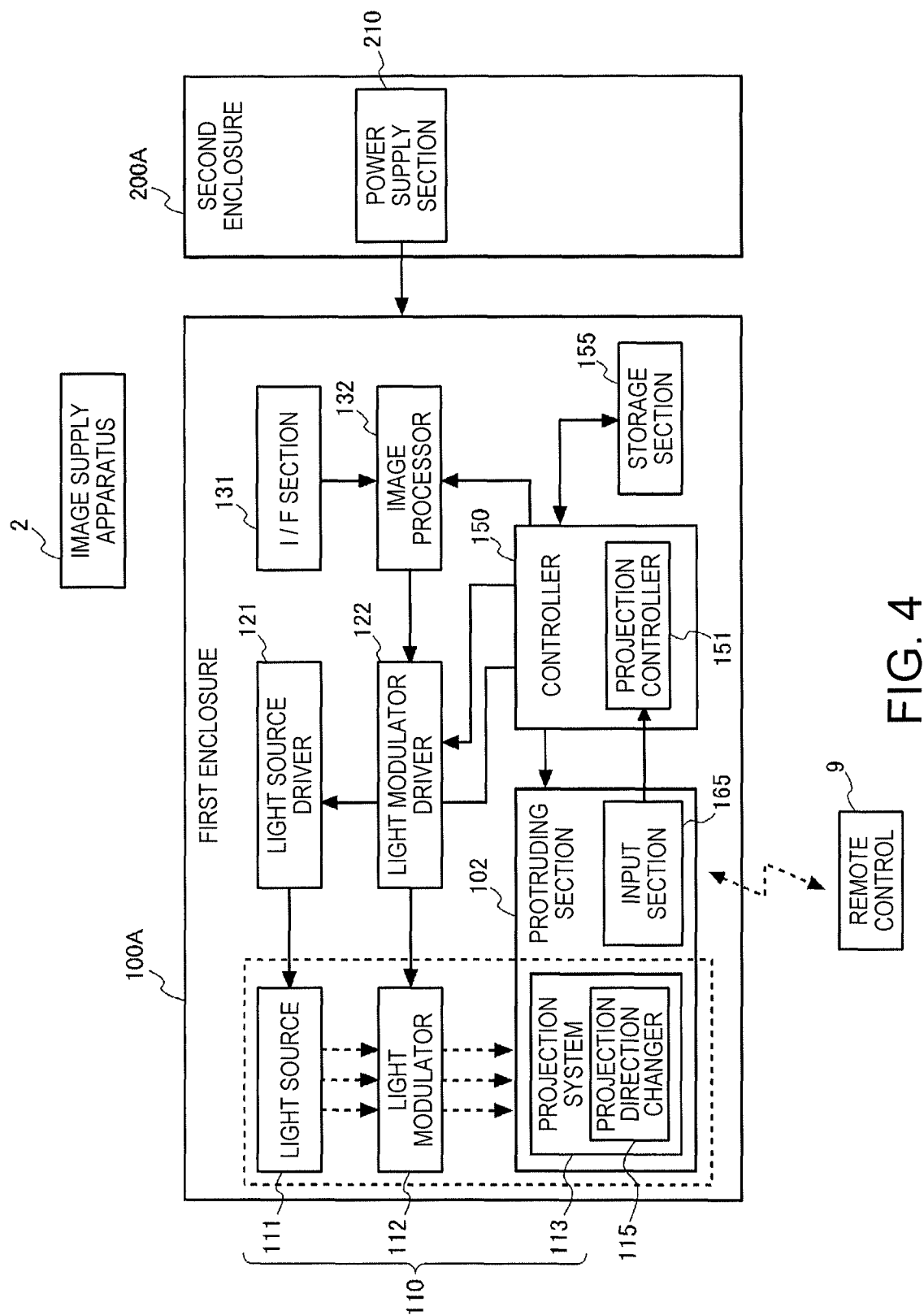
FIG. 4 is a functional block diagram of a control system of the projector according to the first embodiment.

FIG. 4 is a functional block diagram of a control system of the projector 1A according to the first embodiment.

FIG. 4 also shows a remote control 9. The remote control 9 forms part of the projector 1A. The remote control 9 can instead be considered as a device separate from the projector 1A. In this case, the projector 1A and the remote control 9 form a projection system.

Portions that form the projector 1A are separately accommodated in the first enclosure 100A and the second enclosure 200A, which are configured to be separate from each other. The power supply section 210 accommodated in the second enclosure 200A is connected to an external commercial AC power supply, produces predetermined DC voltage, and supplies each portion accommodated in the first enclosure 100A with electric power.

The configuration of the projector 1A accommodated in the first enclosure 100A will next be described.

The projection section 110 includes a light source 111, a light modulator 112, which modulates light emitted from the light source 111 to produce image light, and a projection system 113, which projects modulated image light from the light modulator 112.

The light source 111 is formed of a lamp, such as a halogen lamp, a xenon lamp, and an ultrahigh-pressure mercury lamp, or a solid-state light source, such as a light emitting diode and a laser light source. The light source 111 may include a light separation system that separates light emitted from a single light source into red (R) light, green (G) light, and blue (B) light. The light source 111 is turned on when it receives electric power supplied from a light source driver 121, which will be described later, and emits light toward the light modulator 112.

The light modulator 112 modulates the light emitted from the light source 111 to produce image light and irradiates the projection system 113 with the image light. The light modulator 112 can be formed of transmissive liquid crystal panels, reflective liquid crystal light valves, digital mirror devices (DMDs), or any other light modulating devices. A light modulator driver 122 is connected to the light modulating devices of the light modulator 112. The light modulator driver 122 drives each of the light modulating devices on the basis of an image signal outputted from an image processor 132 to set the grayscale at each pixel and draws an image in the light modulating device on a frame (screen) basis.

The projection system 113 includes a lens, a mirror, and other components, causes the modulated image light from the light modulator 112 to diverge or converge, and projects the divergent or convergent image light. The projector 1A can form an image through the projection system 113 on a wall surface, a floor surface, or a screen. The projection system 113 is not necessarily formed of a lens or a mirror and may be formed of a lens group formed of a plurality of lenses. The projection system 113 may further include a zoom lens, a focus lens, and other lenses.

The projection system 113 may include a projection direction changer 115, which changes the direction in which the image light is projected. The projection direction changer 115 includes a light path changing element (mirror, for example) disposed in a position where the image light projected through the projection system 113 is received. The light path changing element is attachable to and detachable from the projector 1A.

To project the image light projected through the projection system 113 on a screen or a wall surface, the image light projected through the projection system 113 is reflected off the light path changing element, which changes the direction in which the image light travels, and the image light is projected on the screen or the wall surface.

The projection system 113 and an input section 165, the latter of which will be described later, are accommodated, for example, in the protruding section 102, which is a portion of the first enclosure 100A or the portion exposed through the ceiling surface 71 of the ceiling plate 7. The protruding section 102 may accommodate both the projection direction changer 115 of the projection system 113 and the input section 165 or may accommodate only the projection direction changer 115.

The projector 1A includes an interface (hereinafter written as I/F) section 131, via which an image supply apparatus 2, which outputs image data, is connected to the projector 1A. Examples of the image supply apparatus 2 may include an information processing apparatus, such as a personal computer, an image reproduction apparatus, such as a DVD player, a broadcast receiver, such as a digital television tuner, and an image output apparatus, such as a video game console and a personal computer. The image supply apparatus 2 may instead be a communication apparatus or any other apparatus that communicates with a personal computer or any other apparatus and receives image data therefrom.

FIG. 4 shows the image supply apparatus 2 along with the projector 1A. For example, the image supply apparatus 2 is installed in the indoor space, which is the first space, and the projector 1A is installed behind the ceiling, which is the second space.

The I/F section 131 can be configured to communicate with the image supply apparatus 2 via wireless data communication that complies with wireless LAN (WiFi (registered trademark)), Miracast (registered trademark), Bluetooth (registered trademark), or any other wireless communication standard. The I/F section 131 may instead be wired to the image supply apparatus 2. In this case, the I/F section 131 includes a connector and an interface circuit. The I/F section 131 may further include a connector to which a portable recording medium, such as an SD (secure digital) memory card or any other card-shaped recording medium and a USB memory device, can be connected and an interface circuit.

The projector 1A includes a controller 150, which controls each portion of the projector 1A. The controller 150 controls each portion of the projector 1A to cause the projection section 110 to display (project) an image based on the image data inputted to the I/F section 131.

The image processor 132, which processes the image data and outputs an image signal used for display operation to the projection section 110, is connected to the I/F section 131. The image processor 132 acquires the image data inputted from the image supply apparatus 2 to the I/F section 131 and performs image processing on the acquired image data. Further, in a case where a portable storage medium is connected to the I/F section 131, the image processor 132 may read and acquire image data from the storage medium and process the image data in the same manner in which the image processor 132 processes the image data inputted from the image supply apparatus 2.

The controller 150 includes, for example, a CPU, a ROM, and a RAM that are not shown, and the CPU executes a program stored in the ROM or a storage section 155, which will be described later, to control each portion of the projector 1A.

The storage section 155, the image processor 132, the light source driver 121, the light modulator driver 122, and the input section 165 are connected to the controller 150. The controller 150 has a projection controller 151 as a functional block that controls the portions described above. The projection controller 151 is a functional block achieved by cooperation between software and hardware when the CPU in the controller 150 executes a program.

The storage section 155 is formed of a nonvolatile storage device, such as a flash memory, and stores data processed by the controller 150 and programs executed by the CPU in the controller 150. The storage section 155 may further store image data to be projected by the projector 1A.

The image processor 132 is connected to the I/F section 131 and acquires the image data inputted to the I/F section 131. The image processor 132 performs a variety of processing on the acquired image data under the control of the controller 150. For example, the image processor 132 carries out a resolution conversion process of converting the resolution of the image data in accordance with the display resolution of the light modulator 112. The image processor 132 further carries out a geometric correction process of correcting the shape of the image data, a color tone correction process of correcting the color tone of the image data, and other processes. The image processor 132 produces an image signal for displaying the processed image data and outputs the image signal to the light modulator driver 122.

In the case where the storage section 155 stores image data, the image processor 132 may perform the image processing described above on the image data stored in the storage section 155. In this case, the controller 150 reads the image data from the storage section 155 and outputs the image data to the image processor 132. The image processor 132 processes the image data and outputs an image signal to the light modulator driver 122.

The light source driver 121 supplies the light source 111 with drive current and pulses to cause the light source 111 to emit light. The light source driver 121 may be configured to be capable of adjusting the luminance of the light emitted from the light source 111.

The light modulator driver 122 drives the light modulator 112 on the basis of the image signal inputted from the image processor 132 to draw an image in the light modulator 112 on a frame basis under the control of the controller 150.

The projection controller 151 controls the projection section 110 to cause it to project an image.

The projection controller 151 further controls execution timing at which the image processor 132 carries out the processes described above, execution conditions under which the image processor 132 carries out the processes, and other factors. The projection controller 151 still further controls the light source driver 121 to cause it to adjust or otherwise change the luminance of the light emitted from the light source 111. The projection controller 151 still further controls the process in which the light modulator driver 122 draws an image in the light modulator 112.

The controller 150 is connected to the input section 165. The input section 165 functions as a remote control light receiver, receives an infrared signal transmitted from the remote control 9, and outputs an operation signal representing operation performed on the remote control 9 to the controller 150. When the controller 150 detects an instruction of projection of an image on the basis of the operation signal inputted from the input section 165, the controller 150 performs projection on the basis of the image data inputted to the I/F section 131 or the image data stored in the storage section 155. Further, when the controller 150 detects an instruction of termination of the projection on the basis of the operation signal inputted from the input section 165, the controller 150 terminates the projection.

As described above, the projector 1A according to the first embodiment to which the invention is applied includes the first enclosure 100A, which accommodates the projection section 110, and the second enclosure 200A, which accommodates the power supply section 210. The second enclosure 200A is fixed to one of the ceiling joist receivers 5, which serve as the support member that supports the ceiling plate 7, which partitions the entire space into the space behind the ceiling and a living room space. The first enclosure 100A, which accommodates the projection section 110, and the second enclosure 200A, which accommodates the power supply section 210, are configured to be separate from each other.

The weight of the first enclosure 100A, which accommodates the projection section 110, can therefore be reduced, whereby the first enclosure 100A can be readily installed on the partitioning surface, such as the ceiling plate 7, which partitions a space.

The projection port 103, which is formed in the first enclosure 100A, is exposed through the ceiling opening 8 provided in the ceiling plate 7, and the projection section 110 projects image light into the living room space separated by the ceiling plate 7. The image light can therefore be projected into the living room space with the projection port 103 of the first enclosure 100A exposed through the ceiling opening 8 provided in the ceiling plate 7.

The second enclosure 200A is fixed to one of the ceiling joist receivers 5 via the pair of plates 42, which sandwich the ceiling joist receiver 5 on opposite sides. The second enclosure 200A can therefore be fixed to the ceiling joist receiver 5 in a simple configuration.

The first enclosure 100A includes the attachment springs 25, which press the ceiling plate 7 to fix the first enclosure 100A to the ceiling plate 7 with the projection port 103 exposed through the ceiling opening 8. The first enclosure 100A can therefore be fixed to the ceiling plate 7 in a simple configuration.

Second Embodiment

Figure 5:
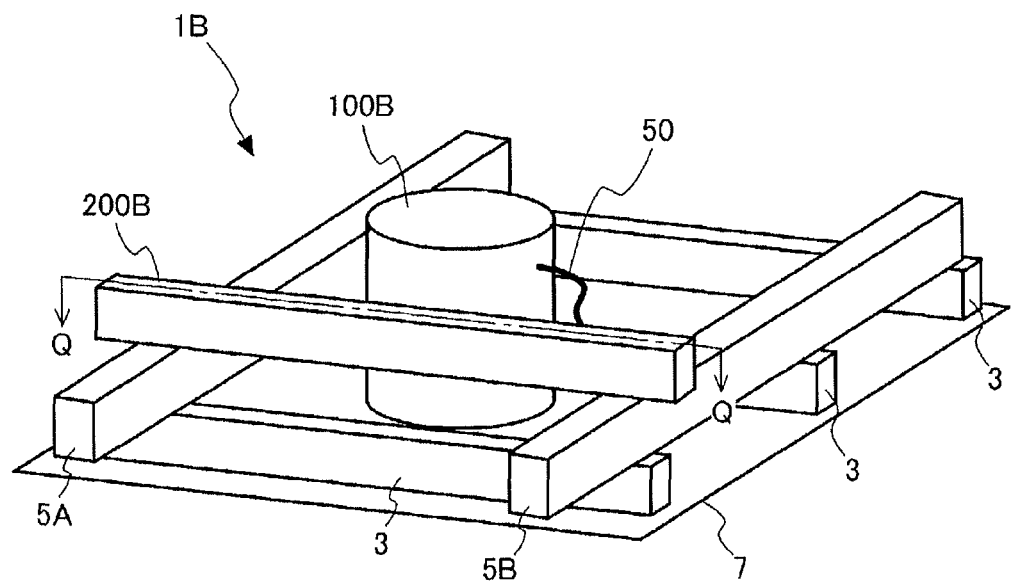
FIG. 5 is a perspective view showing the state in which a projector according to a second embodiment is installed.

FIG. 5 is a perspective view showing the state in which a projector 1B according to a second embodiment is installed.

In the present embodiment, the configurations common to those of the projector 1A described in the above first embodiment have the same reference characters and will not be described.

A first enclosure 100B in the second embodiment has a cylindrical shape, and a second enclosure 200B in the second embodiment has an elongated, box-like shape, as in the first embodiment. The second enclosure 200B accommodates the power supply section 210, and the power supply section 210 supplies the projection section 110 and other components accommodated in the first enclosure 100B with electric power via the power supply cable 50.

The second enclosure 200B in the second embodiment is installed over two adjacent ceiling joist receivers 5. That is, the second enclosure 200B is so disposed that the longitudinal direction thereof is parallel to the ceiling plate 7 and the ceiling joists 3 but is not parallel to the ceiling joist receivers 5. The second enclosure 200B is fixed to each of the ceiling joist receivers 5 over which the second enclosure 200B is disposed. The ceiling joist receivers 5 to which the second enclosure 200B is fixed are written as ceiling joist receivers 5A and 5B. The ceiling joist receiver 5A is the left ceiling joist receiver and the ceiling joist receiver 5B is the right ceiling joist receiver in the plane of view of FIG. 5.

Further, in the second embodiment, the first enclosure 100B is fixed to the second enclosure 200B. With the first enclosure 100B fixed to the second enclosure 200B, the first enclosure 100B adopts a posture in which the longitudinal direction thereof is perpendicular to the ceiling plate 7.

Figure 6:
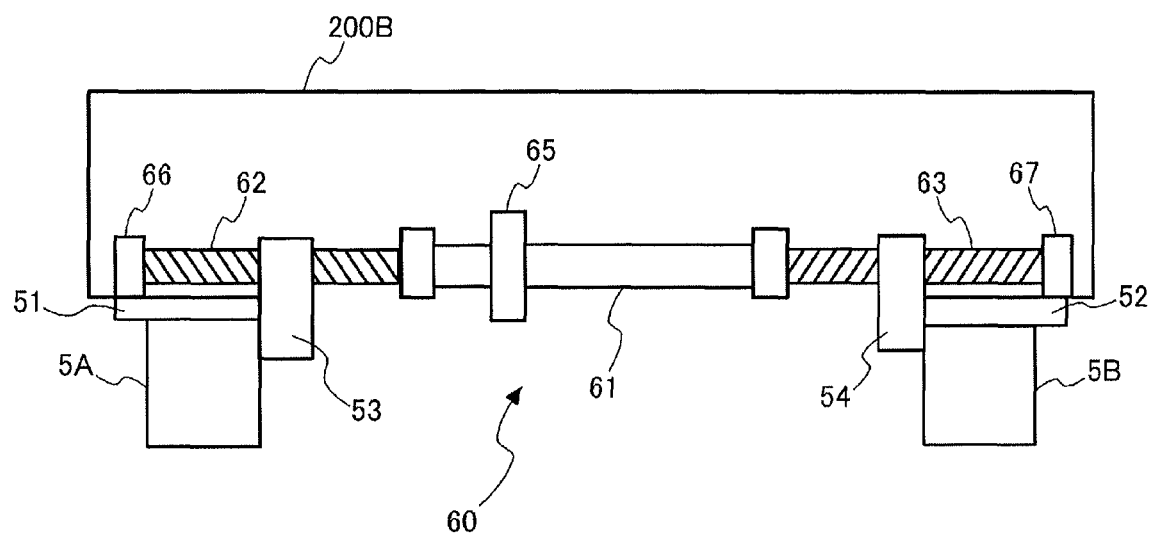
FIG. 6 is a cross-sectional view of a second enclosure taken along the line Q-Q in FIG. 5.

FIG. 6 is a cross-sectional view of the second enclosure 200B taken along the line Q-Q in FIG. 5.

The second enclosure 200B is fixed to the ceiling joist receivers 5A and 5B via a fixture 60. The fixture 60 includes a screw shaft 61, a first plate 53, a second plate 54, and bearings 66 and 67.

The screw shaft 61 is so configured that a central portion thereof forms an operation section 65 for rotating the screw shaft 61 and the screw shaft 61 has right and left portions located on opposite sides of the operation section 65 and threaded in opposite directions. The left threaded portion of the screw shaft 61 is called a left screw section 62, and the right threaded portion of the screw shaft 61 is called a right screw section 63.

Opposite end portions of the screw shaft 61 are supported by the bearings 66 and 67, which are fixed to the second enclosure 200B.

A through hole is formed in each of the first and second plates 53, 54, and the surface of each of the through holes is threaded. The left screw section 62 of the screw shaft 61 is screwed into the first plate 53, and the right screw section 63 of the screw shaft 61 is screwed into the second plate 54.

Seat sections 51 and 52 are so fixed to the first and second plates, 53, 54 as to protrude outward, and the second enclosure 200B is so installed that the seat sections 51 and 52 are placed on the ceiling joist receivers 5A and 5B, respectively.

The first plate 53 is disposed between the ceiling joist receivers 5A and 5B adjacent to each other and so disposed as to face one of the facing surfaces of the ceiling joist receivers 5A and 5B that face each other, that is, the facing surface of the ceiling joist receiver 5A.

The second plate 54 is disposed between the ceiling joist receivers 5A and 5B adjacent to each other and so disposed as to face one of the facing surfaces of the ceiling joist receivers 5A and 5B that face each other, that is, the facing surface of the ceiling joist receiver 5B.

When the operation section 65 is so operated that the screw shaft 61 rotates in a predetermined direction, the first plate 53, into which the left screw section 62 of the screw shaft 61 is screwed, presses the ceiling joist receiver 5A outward (toward the side opposite the ceiling joist receiver 5B), and the second plate 54, into which the right screw section 63 of the screw shaft 61 is screwed, presses the ceiling joist receiver 5B outward (toward the side opposite the ceiling joist receiver 5A).

When the first plate 53 and the second plate 54 are pressed outward, the second enclosure 200B is held by and fixed to the ceiling joist receivers 5A and 5B.

How to fix the first enclosure 100B to the second enclosure 200B will next be described.

The first enclosure 100B is fixed to the second enclosure 200B. The position on the second enclosure 200B where the first enclosure 100B is fixed thereto can be changed. The second enclosure 200B allows the first enclosure 100B to be fixed thereto in a variety of positions in the longitudinal direction thereof.

Further, the position of the first enclosure 100B fixed to the second enclosure 200B can be changed. The position where the first enclosure 100B is fixed to the second enclosure 200B can be changed in the longitudinal direction of the first enclosure 100B.

Figure 7:
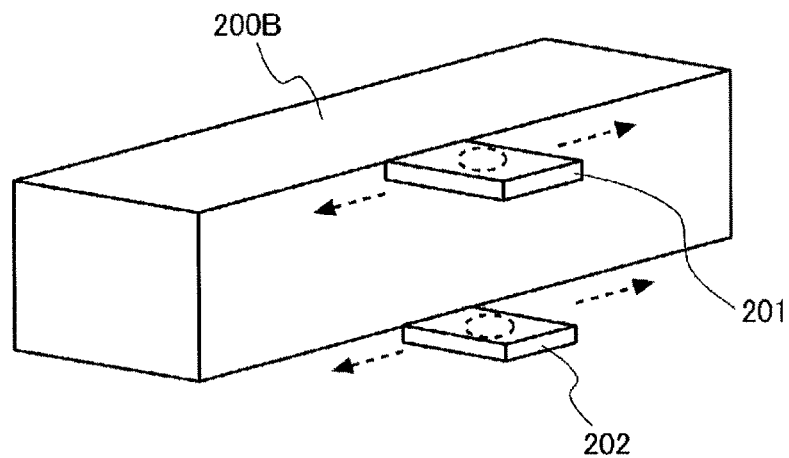
FIG. 7 is a perspective view showing the second enclosure.

FIG. 7 is a perspective view of the second enclosure 200B.

Two bolt holders 201 and 202 are formed as part of the second enclosure 200B. Each of the bolt holders 201 and 202 has a hole formed therein, and a bolt 81, which will be described later, is inserted through the holes. The surface of the hole of at least one of the bolt holders 201 and 202 is threaded to form a female screw.

The bolt holders 201 and 202 are detachably attached to the second enclosure 200B, and the position where each of the bolt holders 201 and 202 is attached to the second enclosure 200B can be changed in the longitudinal direction of the second enclosure 200B. The configuration allows the first enclosure 100B to be fixed to the second enclosure 200B in a variety of positions in the longitudinal direction thereof.

In place of the attachable/detachable configuration of the bolt holders 201 and 202, the bolt holders 201 and 202 may be configured to slide in the longitudinal direction of the second enclosure 200B. FIG. 7 shows the two bolt holders 201 and 202, but the number of bolt holders 201 and 202 are not limited to two.

Figure 8:
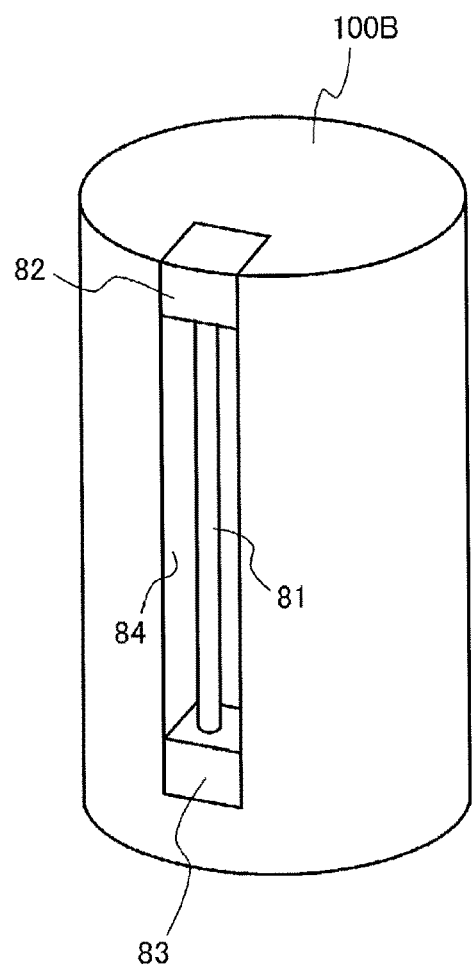
FIG. 8 is a perspective view of a first enclosure.

FIG. 8 is a perspective view of the first enclosure 100B.

A groove 84 is formed in the side surface of the first enclosure 100B along the longitudinal direction thereof, and bolt holders 82 and 83 are formed on the opposite ends of the groove 84. The bolt 81 inserted through the bolt holders 201 and 202 (not shown in FIG. 8) of the second enclosure 200B is disposed between the bolt holders 82 and 83.

The bolt holders 82 and 83 rotatably hold the bolt 81. With the projector 1B installed on the ceiling, the bolt 81 is so held that the axial direction thereof is perpendicular to the ceiling plate 7. At least one of the bolt holders 82 and 83 has an operation mechanism (not shown) for rotating the bolt 81 and a lock mechanism (not shown) for restricting the rotation of the bolt 81 after the rotation is completed.

Figure 9:
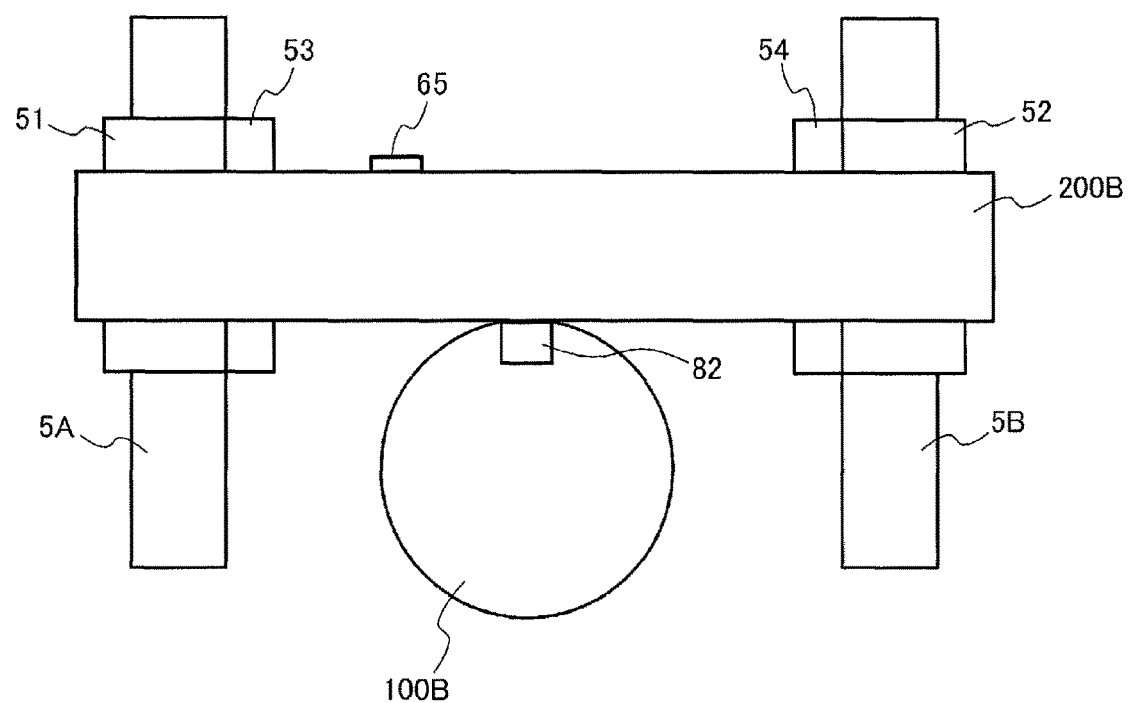
FIG. 9 is a top view showing the state in which the projector according to the second embodiment is installed.

FIG. 9 is a top view showing the state in which the projector 1B according to the second embodiment is installed.

Figure 10:
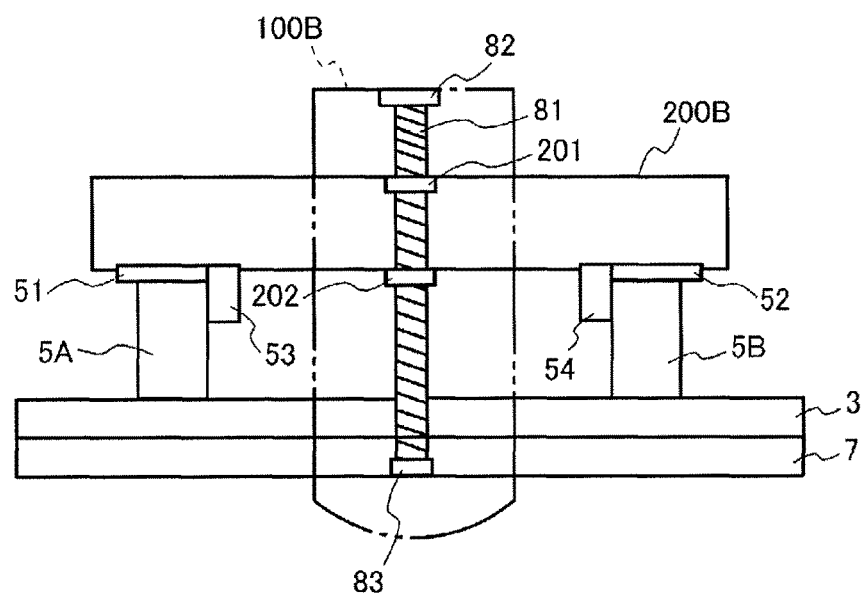
FIG. 10 shows the state in which the first enclosure is fixed to the second enclosure.

FIG. 10 shows the state in which the first enclosure 100B is fixed to the second enclosure 200B.

The positions in the longitudinal direction of the second enclosure 200B where the bolt holders 201 and 202 are attached to the second enclosure 200B are first adjusted. That is, with the second enclosure 200B fixed to the ceiling joist receivers 5A and 5B, the positions where the bolt holders 201 and 202 are attached are so adjusted that the protruding section 102 of the first enclosure 100B is exposed through the ceiling opening 8 bored through the ceiling plate 7.

When the bolt 81 is rotated with the male screw of the bolt 81 screwed into the female screws formed on the bolt holders 201 and 202 of the second enclosure 200B, the first enclosure 100B moves relative to the second enclosure 200B along the axial direction of the bolt 81. That is, rotating the bolt 81 allows the position of the first enclosure 100B fixed to the second enclosure 200B to be changed in the longitudinal direction of the first enclosure 100B. As a result, for example, even in a case where the height of the ceiling joist receivers 5A and 5B varies, the protruding section 102 of the first enclosure 100B can be exposed through the ceiling opening 8, and image light is allowed to exit through the projection port.

As described above, the projector 1B according to the second embodiment to which the invention is applied provides the following advantageous effects in addition to those provided by the projector 1A according to the first embodiment described above.

In the projector 1B according to the second embodiment, the first enclosure 100B is fixed to the second enclosure 200B. The position on the second enclosure 200B where the first enclosure 100B is fixed thereto can be changed in the longitudinal direction thereof (direction parallel to ceiling plate 7). The position where the first enclosure 100B is installed can therefore be changed in accordance with the environment in which the projector 1B is installed.

Further, the position of the first enclosure 100B fixed to the second enclosure 200B can be changed in the longitudinal direction of the first enclosure 100B (direction perpendicular to ceiling plate 7). The position of the first enclosure 100B fixed to the second enclosure 200B can therefore be changed in accordance with the environment in which the projector 1B is installed.

Each of the embodiments described above only shows an aspect of the invention and can be arbitrarily changed and applied within the scope of the invention.

For example, each of the projectors 1A and 1B can have an arbitrary detailed configuration, and the configurations of the projectors 1A and 1B accommodated in the first enclosures 100A, 100B and the second enclosures 200A, 200B can also be changed.

For example, the portions shown in FIG. 4 but excluding the projection section 110 may be accommodated in the second enclosure 200A or 200B. Further, the projection section 110, the light source driver 121, the light modulator driver 122, the I/F section 131, the image processor 132, the input section 165, and other sections may be accommodated in the first enclosure 100A or 100B, and the power supply section 210, the controller 150, and the storage section 155 may be accommodated in the second enclosure 200A or 200B.

Further, for example, an antenna and a light receiver for receiving a wireless signal transmitted from the remote control 9 may be disposed in the second enclosure 200A or 200B.

The above embodiments have been described with reference to the configuration in which part of the first enclosure 100A or 100B (protruding section 102) protrudes from the ceiling plate 7 into the indoor space, and the entire first enclosure 100A or 100B can instead be disposed behind the ceiling. Further, in the embodiments described above, the second enclosures 200A and 200B are fixed to part of the ceiling joist receivers 5, and the second enclosures 200A and 200B may instead be fixed to part of the ceiling joists 3.

The above embodiments have been described with reference to the case where the projectors 1A and 1B are installed behind a ceiling, and the projectors 1A and 1B can instead be embedded behind a wall surface or a floor surface or may instead be embedded in a piece of furniture or a fixture. The projectors 1A and 1B can even be installed outdoor.

In each of the embodiments described above, the remote control 9 is not limited to a dedicated device used with the projector 1A or 1B. The remote control 9 only needs to be capable of transmitting an operation signal to the projector 1A or 1B in the form of an infrared signal or a wireless signal that complies with WiFi or Bluetooth. Further, in the projectors 1A and 1B, the input section 165 only needs to receive a signal transmitted from the remote control 9, and the format and physical requirements of the signal can be arbitrarily changed. Therefore, for example, as the remote control 9, a smartphone or a tablet computer may be used. A smartphone or a tablet computer in which an application program for operating the projector 1A or 1B is installed can function as the remote control 9. According to this configuration, a general-purpose smartphone or tablet computer can be used as the remote control 9. Further, a configuration in which the smartphone or tablet computer that functions as the remote control 9 also functions as the image supply apparatus 2 can, of course, be achieved.

Each of the functional blocks shown in FIG. 4 represents a functional configuration achieved by cooperation between hardware and software and is not necessarily implemented in a specific form. Therefore, hardware corresponding to each of the functional blocks is not necessarily implemented, and a single processor that executes a program can, of course, achieve the functions of the plurality of functional portions. Further, in the embodiments described above, part of the functions achieved by software in the embodiment described above may be achieved by hardware, or part of the functions achieved by hardware may be achieved by software. In addition, the specific detailed configuration of each of the other portions in the projectors 1A and 1B can be arbitrarily changed to the extent that the change does not depart from the substance of the invention.

What is claimed is:

1. A projector to be installed in a ceiling of a building having a hanging ceiling structure, the projector comprising:
   a projection section that projects image light, the projection section including a light source, a light modulator that modulates light emitted from the light source to produce the image light, and a projection system that projects the image light from the light modulator;
   a power supply section that supplies the projection section with electric power;
   a first enclosure that accommodates the projection section; and
   a second enclosure that accommodates the power supply section, wherein
      the second enclosure is configured to be fixed to a support member that is supported by a building frame of the building, the second enclosure is not fixed to the ceiling, the second enclosure is directly fixed to the support member, and the first enclosure is indirectly fixed to the support member via the second enclosure,
      a partitioning surface of the ceiling is configured to be support by the support member and to partition a space into a first space that is an indoor space of the building and a second space that is a space behind the ceiling of the building,
      the first enclosure and the second enclosure are configured to be separate from each other,
      at least part of the first enclosure is disposed in the second space such that a weight of the first enclosure on the first space is reduced,
      a projection port formed in the first enclosure is exposed through an opening provided in the partitioning surface,
      the projection section projects the image light through the projection port into the first space, and
      the first enclosure is fixed to the second enclosure.

2. The projector according to claim 1, wherein a position on the second enclosure where the first enclosure is fixed thereto is allowed to be changed in a direction parallel to the partitioning surface.

3. The projector according to claim 1, wherein a position of the first enclosure fixed to the second enclosure is allowed to be changed in a direction perpendicular to the partitioning surface.

4. The projector according to claim 1, wherein the first space is an indoor space of a building.

5. The projector according to claim 1, wherein the second space is above the ceiling, and the first space is below the ceiling.

* * * * *